United States Patent
Ji et al.

(10) Patent No.: US 12,454,792 B2
(45) Date of Patent: *Oct. 28, 2025

(54) METHOD FOR PREPARING BIOMECHANICAL UNBLEACHED PULP FROM WHEAT STRAW AND FULL UTILIZATION OF BY-PRODUCTS THEREOF

(71) Applicant: Qilu University of Technology, Jinan (CN)

(72) Inventors: Xingxiang Ji, Jinan (CN); Ruiming Wang, Jinan (CN); Zhongjian Tian, Jinan (CN); Jiachuan Chen, Jinan (CN); Guihua Yang, Jinan (CN); Gaojin Lv, Jinan (CN)

(73) Assignee: Qilu University of Technology, Jinan (CN)

( * ) Notice: Subject to any disclaimer, the term of this patent is extended or adjusted under 35 U.S.C. 154(b) by 979 days.

This patent is subject to a terminal disclaimer.

(21) Appl. No.: 17/561,237

(22) Filed: Dec. 23, 2021

(65) Prior Publication Data
US 2022/0205177 A1    Jun. 30, 2022

(30) Foreign Application Priority Data
Dec. 31, 2020    (CN) .......................... 202011641351.2

(51) Int. Cl.
| | | |
|---|---|---|
| *D21C 1/02* | (2006.01) | |
| *C05F 7/02* | (2006.01) | |
| *C12P 1/00* | (2006.01) | |
| *D21B 1/06* | (2006.01) | |
| *D21C 1/06* | (2006.01) | |
| *D21C 5/00* | (2006.01) | |
| *D21C 9/02* | (2006.01) | |
| *D21C 11/00* | (2006.01) | |
| *D21C 11/10* | (2006.01) | |
| *D21D 1/20* | (2006.01) | |
| *D21H 11/12* | (2006.01) | |

(52) U.S. Cl.
CPC ................ *D21C 5/005* (2013.01); *C05F 7/02* (2013.01); *C12P 1/00* (2013.01); *D21B 1/061* (2013.01); *D21C 1/02* (2013.01); *D21C 1/06* (2013.01); *D21C 9/02* (2013.01); *D21C 11/0007* (2013.01); *D21C 11/10* (2013.01); *D21D 1/20* (2013.01); *D21H 11/12* (2013.01); *C12P 2201/00* (2013.01)

(58) Field of Classification Search
CPC ............. D21C 1/06; D21C 1/02; D21C 5/005
See application file for complete search history.

(56) References Cited

U.S. PATENT DOCUMENTS

| | | | | |
|---|---|---|---|---|
| 10,087,476 | B2 * | 10/2018 | Foody ................ | D21C 11/0007 |
| 10,240,171 | B2 * | 3/2019 | Baets ....................... | D21C 1/06 |
| 11,566,376 | B2 * | 1/2023 | Ji .......................... | D21H 11/12 |
| 11,624,154 | B2 * | 4/2023 | Chen ....................... | D21C 1/06 |
| | | | | 162/91 |
| 11,834,784 | B2 * | 12/2023 | Ji .......................... | D21H 11/18 |
| 2005/0241785 | A1 * | 11/2005 | Peng ..................... | D21B 1/021 |
| | | | | 162/96 |

FOREIGN PATENT DOCUMENTS

WO    WO-2009056017 A1 *    5/2009    .............. C05F 11/00

* cited by examiner

*Primary Examiner* — Anthony Calandra
(74) *Attorney, Agent, or Firm* — Flener IP & Business Law

(57) ABSTRACT

The disclosure belongs to the technical field of papermaking technology and waste comprehensive utilization, and specifically relates to a method for preparing biomechanical unbleached pulp from wheat straw and full utilization of by-products thereof. In the present disclosure, wheat straw is used as raw materials for pulping, and treated by hot water, then a trace of KOH is added, the temperature of the wheat straw after heat saturation and softening is adjusted, alkaline compound enzymes is added for biological treatment, and refining of wheat straw is performed at last. The mechanical pulp meets the production requirements for unbleached packaging paper and paper-based materials, meanwhile, the by-products are recycled to prepare a biomass compound fertilizer, turning solid waste into treasures, and realizing a high value full utilization of wheat straw. Thus a good practical application value and a broad application prospect are performed.

10 Claims, No Drawings

METHOD FOR PREPARING BIOMECHANICAL UNBLEACHED PULP FROM WHEAT STRAW AND FULL UTILIZATION OF BY-PRODUCTS THEREOF

CROSS REFERENCE TO RELATED APPLICATION

This patent application claims the benefit and priority of Chinese Patent Application No.202011641351.2 filed on Dec. 31, 2020, the disclosure of which is incorporated by reference herein in its entirety as part of the present application.

TECHNICAL FIELD

The disclosure belongs to the technical field of papermaking technology and waste comprehensive utilization, and specifically relates to a method for preparing biomechanical unbleached pulp from wheat straw and full utilization of by-products thereof.

BACKGROUND ART

Disclosure of the background information is only intended to increase the understanding of the overall background of the present disclosure which is not necessarily regarded as an admission or any form of suggestion that the information constitutes the prior art known to those skilled in the art.

Paper industry is a consumer goods industry as well as an important basic raw material industry, involving life, education, industry, agriculture, national defense and aviation and many other fields. In 2016, pulp imports reached 21.06 million tons, waste paper imports reached 28.5 million tons in China, and the import dependence of papermaking fibrous raw materials was approximately 50%. Large amounts of waste paper imports made up for the gap of fibrous raw materials in China and supported the development of the paper industry. In April 2017, the government issued the "Implementation Plan for Prohibiting the Entry of Foreign Garbage and Advancing the Reform of the Solid Waste Import Administration System", definitely stipulated that the import of unsorted waste paper would be prohibited in China from the end of the year. The total amount of waste paper imports in 2018 was 33% of that in 2017. In 2020, China banned the import of waste paper. China is facing an annual shortage of about 26 million tons of papermaking raw materials. Shortage of resources in traditional paper industry will be further highlighted. The Research and development of new paper-making raw materials is imminent. For this reason, researchers have been digging out and searching for new papermaking raw materials in recyclable and renewable grass-based raw materials.

In traditional chemical pulping process, most of the hemicellulose of plant raw materials is degraded and dissolved in a black liquor of pulping. The black liquor is usually treated with combustion method to recycle heat and chemicals. Due to the low calorific value of hemicellulose combustion in the black liquor, direct combustion treatment of hemicellulose not only wastes energy, but also consumes good biomass resources. At present, pollution is a biggest problem in the development of pulping and papermaking from grass resources, which is a main problem of straw pulp and even the key issue of straw pulp survival. Therefore, research and development of low-pollution, low-energy, high-quality pulping methods suitable for straw pulp is a research focus of paper industry in China, as well as an industry development bottleneck that urgently needs to be broken through. For this reason, the applicant proposes a method for preparing biomechanical unbleached pulp from wheat straw straws, including using wheat straw as a raw material for pulping, treating the wheat straw by steaming or hot water, then adding a trace of alkali, adjusting a temperature of hydrothermally saturated and softened wheat straw, adding an alkaline compound enzyme for biological treatment, and performing refining of wheat straw at last. The prepared mechanical pulp meets the production requirements of unbleached packaging paper and paper-based materials (see CN109577072A). However, the problem of by-products produced during pulping process has not been well resolved, which is detrimental to the comprehensive high-value utilization of agricultural straw.

SUMMARY

In view of the problems described above, the present disclosure provides a method for preparing biomechanical unbleached pulp from wheat straw and full utilization of by-products thereof. In the present disclosure, wheat straw is used as a raw material for pulping, the wheat straw is treated by hot water, then a trace of KOH is added, the temperature of a hydrothermally saturated and softened wheat straw heat is adjusted, an alkaline compound enzyme are added for biological treatment, and refining of wheat straw at last are performed. The mechanical pulp meets the production requirements of unbleached packaging paper and paper-based materials, and meanwhile the by-products is recycled to prepare a biomass compound fertilizer, turning solid waste into treasures, and realizing a high value full utilization of wheat straw. Thus a good practical application value and a broad application prospect are performed.

The present disclosure adopts the following technical solutions:

A first aspect of the present disclosure provides a method for preparing biomechanical unbleached pulp from wheat straw and full utilization of by-products thereof, including the following steps:

(1) cutting a physically-screened and dust-removed wheat straw into small pieces of 1-8 cm as raw materials, putting them into a processor or a reactor, performing a hot water treatment according to a liquid ratio of 1:4-1:8 for 15-90 min; meanwhile collecting rotten wheat straw which cannot be used for processing;

(2) adding KOH to a mixture of hot water and hot water treated wheat straw in the reactor or processor, adjusting pH of the hot water to 10-14, and performing a hydrothermal saturation and softening treatment on the wheat straw; collecting waste lye;

(3) treating a hydrothermally saturated and softened wheat straw with an alkaline biological compound enzyme in a biological processor for 30-90 min in a liquid ratio of 1:3-1:8 (W/V); collecting wastewater produced in an enzyme treatment stage;

(4) refining an enzyme treated wheat straw after treatment in step (3) with a pulp refiner; and (5) washing a refined wheat straw to obtain biomechanical pulp; disintegrating and mixing the biomechanical pulp homogeneously with a fiber disintegrator to obtain unbleached pulp, collecting refining washing water;

treating the waste lye, the wastewater produced in the enzyme treatment stage, and the refining washing water with a multi-effect evaporator to prepare residue by evaporation and concentration, and recycling heat energy for use in a hot water treatment stage of step (1); mixing the residue and the wheat straw (such as rotten straw) which cannot be used for processing in step (1) and adjusting pH thereof to prepare a fertilizer.

A second aspect of the present disclosure provides mechanical pulp and/or fertilizer prepared by the method described above.

A third aspect of the present disclosure provides a use of the mechanical pulp described above in the preparation of unbleached packaging paper, paper-based materials and/or a use of the fertilizer in promoting crop growth.

Beneficial technical effects of one or more embodiments described above:

In the present disclosure, wheat straw is used as a raw material, and pretreated by hot water, a trace of KOH is added, then a hydrothermal saturation and softening treatment is conducted, alkaline biological enzymes are added for an enzyme treatment, and refining and washing are performed. The pH of the bio-mechanical pulp is close to neutral at the completion of the refining. A multi-effect evaporator is used to treat the refining washing water, the solid residue is recycled for boiler incineration and the heat energy is recycled for the hot water pretreatment stage. The whole production process without alkali recycle avoids environmental pollution from the source. The technology conforms to the national industrial policy of resource conservation, economic recycle, energy conservation and emission reduction, which overcomes difficulties in recycling and serious pollution of straw pulp waste lye in the prior art, and is of great significance to industrial production of straw pulp and development of paper industry.

In the present disclosure, wheat straw is used as raw materials to produce mechanical pulp, which not only improves the utilization rate and additional value of agricultural residues, increases farmers' income, but also solves the environmental issue caused by incineration of wheat straw due to insufficient utilized from the source.

In the present disclosure, hot water is used to treat the wheat straw, which partially dissolve out resin compounds in straw pulp and reduces resin obstacles caused by paper-making process; after a hot water treatment, a trace of alkali is added to partially dissolve out lignin, with components such as pectin and hemicellulose dissolving out at the same time; then an alkaline compound enzyme is added, by adjusting the ratio, dosage and treatment time of which, effective extraction of hemicellulose and lignin is achieved on the one hand, and a higher pulping yield and pulping quality is ensured on the other hand. The pulping yield of the method herein is up to 75% or more, and a biomass phosphate-potassium compound fertilizer with good fertilizer efficiency and storage stability is obtained.

The method of the present disclosure is simple and has low requirements for equipment, which is suitable for the production of large and medium-sized production lines of pulp and paper. At the same time, the production process of by-product biomass compound fertilizer is also very simple and easy to be industrialized, thus performing a good practical application value.

DETAILED DESCRIPTION OF THE EMBODIMENTS

It should be noted that the detailed descriptions below are all exemplary and are intended to provide further description of the present disclosure. Unless otherwise specified, all technical and scientific terms used herein have the same meaning as commonly understood by those skilled in the art.

It should be noted that terms used herein is only intended to describe specific embodiments, while are not intended to limit the exemplary embodiments according to the present disclosure. As used herein, unless clearly indicated in the context otherwise, the singular form is also intended to include the plural form. In addition, it should also be understood that when terms "include" and/or "including" are used in this specification, they indicate the existence of characters, steps, operations, and/or combinations thereof.

In view of the problems raised in the background art, a first aspect of the present disclosure provides a method for preparing biomechanical unbleached pulp from wheat straw, including the following steps:

(1) cutting a physically-screened and dust-removed wheat straw into small pieces of 1-8 cm as raw materials, putting them into a processor or a reactor, and performing a hot water treatment according to a liquid ratio of 1:4-1:8 for 15-90 min; meanwhile collecting rotten wheat straw which cannot be used for processing;

(2) adding KOH to a mixture of hot water and hot water treated wheat straw in the reactor or processor, adjusting pH of the hot water to 10-14, and performing a hydrothermal saturation and softening treatment on the wheat straw; collecting waste lye;

(3) treating a hydrothermally saturated and softened wheat straw with an alkaline biological compound enzyme in a biological processor for 30-90 min in a liquid ratio of 1:3 to 1:8 (W/V); collecting wastewater produced in an enzyme treatment stage;

(4) refining an enzyme treated wheat straw after treatment in step (3) with a pulp refiner; and (5) washing a refined wheat straw to obtain biomechanical pulp; disintegrating and mixing the biomechanical pulp homogeneously with a fiber disintegrator to obtain unbleached pulp, collecting refining washing water;

treating the waste lye, the wastewater produced in the enzyme treatment stage, and the refining washing water with a multi-effect evaporator to prepare residue by evaporation and concentration, and recycling heat energy for use in a hot water treatment stage of step (1); mixing the residue and the wheat straw (such as rotten straw) which cannot be used for processing in step (1) and adjusting pH thereof to prepare a fertilizer.

In some embodiments, a temperature in the hot water treatment in step (1) is 80-120° C.

The hot water treatment in this temperature range makes the resin compounds in wheat straw partially dissolve out, and reduces the resin obstacles caused in a paper-making process.

In some embodiments, adding amount of the KOH in step (2) is 0.5%-4%.

After the hot water treatment in step (1), wheat straw begins to soften, and after addition of a trace of alkali, partial hemicellulose and lignin quickly dissolve out and the raw materials are softened.

In some embodiments, the method of hydrothermal saturation and softening treatment in step (2) includes: keeping a temperature of the hot water at 80-120° C. for 20-60 min. Under these conditions, wheat straw fiber material is softened as a whole, and physical folding resistance of the fiber material is significantly improved, making it more difficult to break. Hydrothermal saturation and softening is mainly physical softening, which is advantageous to protect fiber from damage during mechanical refining. The temperature is 50° C. lower, time is shortened by more than 60 minutes, lignin dissolution is less, and pulp yield is about 30% higher compared with traditional chemical pulp cook.

In some embodiments, after a treatment of step (2), pH of the wheat straw is 7-10.

In some embodiments, a temperature in step (3) is 40-60° C.

In some embodiments, the alkaline biological compound enzyme used in step (3) is a compound enzyme of an alkaline xylanase, an alkaline cellulase, and an alkaline pectinase with a dosage of 10-80 IU/mL, and a ratio of an enzyme activity of the alkaline xylanase, the alkaline cellulase, and the alkaline pectinase is 0-6:0-3:0-1.5, each enzyme activity not taking 0; in some embodiments, a ratio of the enzyme activity of the alkaline xylanase, the alkaline cellulase, and the alkaline pectinase is 3-4:1-2:1-1.5. The use of the alkaline biological compound enzyme herein replaces the use of large amounts of alkali, and obtains good pulping performance and higher straw pulp yield, which also effectively improves the fertilizer efficiency and storage stability of the fertilizer by cooperating with the subsequent adding amounts of wastewater.

In step (5), a mass ratio of waste lye, wastewater produced in enzyme treatment stage and washing water of refining is 3-5:15-20:15-20.

A mass ratio of the residue to the rotten straw which cannot be used for processing in Step (1) is 5-8:1-2.

The specific process of making fertilizer with acid adjustment is: adding phosphoric acid to adjust pH to 7, drying, crushing, granulating. By performing a phosphoric acid treatment, alkaline is neutralized and phosphorus and other nutrients are introduced into fertilizer, resulting in a more comprehensive nutrition compound fertilizer.

A second aspect of the present disclosure provides a mechanical pulp and/or a fertilizer prepared by methods described above.

A third aspect of the present disclosure provides a use of the mechanical pulp described above in the preparation of unbleached packaging paper, paper-based materials and/or a use of the fertilizer in promoting crop growth.

In order to enable those skilled in the art to understand the technical solutions of the present disclosure more clearly, the technical solutions herein will be described in detail below in conjunction with specific examples.

Definitions

Unbleached biomechanical pulp: using certain biomass papermaking raw materials to undergo certain physical and biological treatments, and to obtain a paper pulp without any bleaching or color change and maintain the color of the raw materials through mechanical refining methods.

Hydrothermal saturation and softening: soaking wheat straw raw materials in hot water at 80-120° C. for 20-60 minutes. Under this condition, the wheat straw fiber materials are softened as a whole. The stage in which the physical resistance of the fiber material is significantly improved, and difficult to break is called hydrothermal saturation and softening. Hydrothermal saturation softening is mainly physical softening, which is highly beneficial to protect fiber from damage during mechanical refining.

The biological enzymes used are from Shandong Longkete Enzyme Preparation Co., Ltd. and Novozymes China.

Example 1 A method for preparing biomechanical unbleached pulp from wheat straw and full utilization of by-products thereof The method was as following:
(1) a wheat straw raw material after physical selection and dust removal was cut into small pieces of 2 cm as raw materials, then put into a processor or reactor at a room temperature, and a hot water treatment is performed according to a liquid ratio of 1:4, at a temperature of 100° C., and with a treatment time of 30 min; at the same time, rotten wheat straw which could not be used for processing was collected;
(2) 2.5% of KOH was added to a mixture of hot water and a hot water treated wheat straw in the reactor or processor, with a pH of the hot water adjusted to 14, with a treatment time of 30 min, and at a temperature of 100° C., so that a small amount of hemicellulose, lignin, pectin and other substances in wheat straw dissolved out, and meanwhile wheat straw was hydrothermally saturated and softened; a pH value of water-bearing wheat straw reached 8 at the end of the treatment, and the waste lye was collected;
(3) a hydrothermally saturated and softened wheat straw was treated with alkaline biological enzymes a bioprocessor or bioreactor at 55° C. for 90 minutes, in which the liquid ratio was 1:6 kg/L, the enzyme dosage was 20 IU/mL, and the enzyme activity ratio of alkaline xylanase, alkaline cellulase, and alkaline pectinase was 3:2:1; constant stirring and mixing was performed to realize a full function of the wheat straw and alkaline biological enzymes, thus the wheat straw fiber was further softened, and the wastewater produced in an enzyme treatment stage was collected;
(4) a wheat straw after biological treatment was refined with a refiner, and a KPF series high consistency disc refiner was used for high consistency refining; a two-stage refining was adopted, and the refining gap was 0.3 mm for the first stage and 0.15 mm for the second stage, so that a 40° SR beating degree of pulp was obtained; and
(5) a refined wheat straw was washed to obtain a biomechanical pulp; the obtained biomechanical pulp was disintegrated and mixed homogeneously using a fiber disintegrator, thus an unbleached pulp was obtained; the refining washing water was collected;
the waste lye, the wastewater produced in the enzyme treatment stage and the refining washing water were mixed according to a mass ratio of 1:4:4; the multi-effect evaporator was used for evaporation and concentration to prepare residue, and the heat energy was recycled for use in the hot water treatment stage of step (1); the residue was mixed with straw (such as rotten straw) that could not be used as an alternate raw material in step (1) according to a mass ratio of 3:1, and a pH thereof was adjusted to 7 by phosphoric acid, then dried, crushed, and granulated for fertilizer preparation.

Example 2 A method for preparing biomechanical unbleached pulp from wheat straw and full utilization of by-products thereof The method was as following:
(1) a wheat straw raw material after physical selection and dust removal was cut into small pieces of 3 cm as raw materials, then put into a processor or reactor, a hot water mixing treatment was performed according to a liquid ratio of 1:5, at a temperature of 110° C., and with a treatment time of 40 min; at the same time, rotten wheat straw which could not be used for processing was collected;
(2) 2% of KOH was added to a mixture of hot water and wheat straw in the reactor or processor, with a pH of the hot water adjusted to 13, with a treatment time of 30 min, and at a temperature of 95° C., so that a small amount of hemicellulose, lignin, pectin and other substances in the wheat straw dissolved out, and meanwhile the wheat straw was hydrothermally saturated and softened; a pH value of water-bearing wheat straw reaches 8 at the end of the treatment, and the waste lye was collected;

(3) a hydrothermally saturated and softened wheat straw was treated with alkaline biological enzymes in a bioprocessor or bioreactor at 50° C. for 60 min, in which a liquid ratio is controlled at 1:6 kg/L, and the enzyme dosage is 80 IU/mL, and the enzyme activity ratio of alkaline xylanase, alkaline cellulase, and alkaline pectinase was 3:2:1.5; constant stirring and mixing was performed to realize a full function of the wheat straw and alkaline biological enzymes, thus the wheat straw fiber is further softened, and the wastewater produced in an enzyme treatment stage is collected;

(4) a wheat straw after biological treatment was refined with a refiner, and a KPF series high consistency disc refiner was used for high consistency refining; a one-stage refining was adopted, and the refining gap was 0.15 mm, so that a 38° SR beating degree of pulp was obtained; and (5) a refined wheat straw was washed to obtain a biomechanical pulp; the obtained biomechanical pulp was disintegrated and mixed homogeneously using a fiber disintegrator, thus an unbleached pulp is obtained; the refining washing water is collected;

the waste lye, the wastewater produced in the enzyme treatment stage and the refining washing water were mixed according to the mass ratio of 1:5:6; a multi-effect evaporator was used for evaporation and concentration to prepare residue, and heat energy was recycled for use in the hot water treatment stage of step (1); the residue is mixed with straw (such as rotten straw) which could not be used as an alternate raw material in step (1) according to a mass ratio of 3:1, and a pH thereof is adjusted to 7 by phosphoric acid, then dried, crushed, and granulated for fertilizer preparation.

Example 3 A method for preparing biomechanical unbleached pulp from wheat straw and full utilization of by-products thereof (1) a wheat straw raw material after physical selection and dust removal was cut into small pieces of 2 cm as raw materials, then put into a processor or reactor, and a hot water mixing treatment was performed according to a liquid ratio of 1:4, at a temperature of 95° C., and with a treatment time of 60 min; at the same time, rotten wheat straw which could not be used for processing was collected;

(2) 1.5% of KOH was added to a mixture of hot water and wheat straw in the reactor or processor, with a pH of the hot water adjusted to 13, with a treatment time of 30 min, and at a temperature of 100° C., so that a small amount of hemicellulose, lignin, pectin and other substances in the wheat straw dissolved out, meanwhile the wheat straw is water and heat saturated and softened; a pH value of water-bearing wheat straw reached 8 at the end of the treatment, and the waste lye was collected;

(3) a hydrothermally saturated and softened wheat straw were treated with alkaline biological enzymes in a bioprocessor or bioreactor at 55° C. for 70 min, in which, a liquid ratio was controlled at 1:8 kg/L, the enzyme dosage was 60 IU/mL, and the enzyme activity ratio of alkaline xylanase, alkaline cellulase, and alkaline pectinase was 3:2:1.5. Constant stirring and mixing was performed to realize a full function of the wheat straw and alkaline biological enzymes, thus the wheat straw fiber was further softened, and the wastewater produced in an enzyme treatment stage was collected;

(4) a wheat straw after biological treatment was refined with a refiner, and a KPF series high consistency disc refiner was used for high consistency refining; a one-stage of refining is adopted, and the refining gap was 0.2 mm, so that a 42° SR beating degree of pulp was obtained.

(5) a refined wheat straw was washed to obtain a biomechanical pulp; the obtained biomechanical pulp was disintegrated and mixed homogeneously using a fiber disintegrator, thus an unbleached pulp was obtained; the refining washing water is collected;

the waste lye, the wastewater produced in the enzyme treatment stage and the washing water of refining were mixed according to the mass ratio of 1:5:6; a multi-effect evaporator was used for evaporation and concentration to prepare residue, and heat energy was recycled for use in the hot water treatment stage of step (1); the residue was mixed with the straw (such as rotten straw) which could not be used as an alternate raw material in step (1) according to a mass ratio of 4:1, an a pH thereof was adjusted to 7 by phosphoric acid, then dried, crushed, and granulated for fertilizer preparation.

Experimental Example 1: the method herein was the same as that in Example 1, except that the dosage ratio of the alkaline compound enzyme was adjusted such that an enzyme activity ratio of the alkaline xylanase, the alkaline cellulase, and the alkaline pectinase was 6:1:2, and a total dosage was 20 IU/mL.

Experimental Example 2: the method herein was the same as that in Example 1, except that the dosage ratio of the alkaline compound enzyme was adjusted, such that an enzyme activity ratio of alkaline xylanase, alkaline cellulase, and alkaline pectinase was 3:3:1, and a total dosage was 20 IU/mL.

Experimental Example 3: the method herein was the same as that in Example 1, except that the mass ratio of waste lye, wastewater in an enzyme treatment stage and washing water of refining was 2:10:15.

Experimental Example 4: the method herein was the same as that in Example 1, except that the mass ratio of waste lye, wastewater in an enzyme treatment stage and washing water of refining was 2:3:4.

Experimental Example 5: the method herein was the same as that in Example 1, except that the mass ratio of the residue and the rotten wheat straw which could not be used for processing in step (1) was 1:1.

Experimental Example 6: the method is the same as that in Example 1, except that the mass ratio of the residue and the rotten wheat straw which could not be used for processing in step (1) was 10:1.

Effect Verification:

1. Table 1 is a comparison of pulping physical properties of the biomechanical pulp prepared in Example 1, Experimental Examples 1 and 2. It showed that pulping physical properties of each group were good, which met the requirements for producing unbleached packaging paper and paper-based materials. Pulping physical properties of Experimental Examples 3-6 were similar to those of Experimental Example 1.

TABLE 1

Performance determination of biomechanical pulp by different methods.

| Method | Beating degree/ °SR | Breaking length (Km) | Tear index/ mN · m² · g⁻¹ | Pulp yield % | Tensile index |
|---|---|---|---|---|---|
| Example 1 | 41 | 3.25 | 3.51 | 81.6 | 1015 |
| Experimental Example 1 | 41 | 3.16 | 3.48 | 80.8 | 9.19 |
| Experimental Example 2 | 40 | 2.93 | 3.36 | 81.2 | 9.37 |

2. Detection of efficiency of biomass compound fertilizer prepared in Example 1, Experimental Examples 1-6.

(1) Test on Potted Maize

The biomass compound fertilizers prepared in Example 1 and Experimental Examples 1-6 were applied to potted maize for test. A biomass compound fertilizer (3 g/kg soil) was applied at the seedling stage of maize, and the results shown in Table 2 indicated that compared with control group CK without fertilization, the biomass of maize in Example 1 and Experimental Examples 1-6 increased significantly, among which the effect of Example 1 was the best.

TABLE 2

| Example | Biomass(g/pot) | Increase(%) |
|---|---|---|
| CK | 8.28 | — |
| Example 1 | 10.96 | 24.5 |
| Experimental Example 1 | 9.18 | 10.9 |
| Experimental Example 2 | 9.32 | 12.6 |
| Experimental Example 3 | 9.85 | 18.9 |
| Experimental Example 4 | 8.94 | 8.0 |
| Experimental Example 5 | 9.62 | 16.2 |
| Experimental Example 6 | 9.19 | 11.0 |

(2) Test on Potted Wheat

The biomass compound fertilizers prepared in Example 1 and Experimental Examples 1-6 were applied to potted wheat for test. A biomass compound fertilizer (3 g/kg soil) was applied at the seedling stage of wheat, and the results shown in Table 3 indicated that compared with control group CK without fertilization, the biomass of wheat in Example 1 and Experimental Examples 1-6 increased significantly, among which the effect of example 1 was the best.

TABLE 3

| Example | Biomass(g/pot) | Increase(%) |
|---|---|---|
| CK | 11.43 | — |
| Example 1 | 13.37 | 17.0 |
| Experimental Example 1 | 12.42 | 8.7 |
| Experimental Example 2 | 12.76 | 11.6 |
| Experimental Example 3 | 12.81 | 12.1 |
| Experimental Example 4 | 12.39 | 8.4 |
| Experimental Example 5 | 12.62 | 10.4 |
| Experimental Example 6 | 12.54 | 9.7 |

Detection of storage stability of biomass compound fertilizer prepared in Example 1, and Experimental Examples 1-6.

For a long time, caking problem affects appearance quality of compound fertilizers and leading to inconvenience to transportation and application of compound fertilizers. Therefore, in this application, a storage stability (anti-caking performance) of prepared biomass compound fertilizer was tested by a briquetting method, according to a controlled conditions of temperature of 50° C., pressure of 147 N, 15 days. 50 g of compound fertilizer sample was loaded in a ring, and a shear force data was measured on the cylindrical compound fertilizer briquettes. Test results are shown in Table 4. It could be seen that the storage stability of the biomass compound fertilizer prepared in this application was the best, which was better than Experimental Examples 1-6.

TABLE 4

| Example | Shear force(N) | Anti-caking rate(%) |
|---|---|---|
| Example 1 | 34.25 | 54.1 |
| Experimental Example 1 | 46.72 | 37.3 |
| Experimental Example 2 | 48.64 | 34.8 |
| Experimental Example 3 | 50.92 | 31.7 |
| Experimental Example 4 | 47.18 | 36.7 |
| Experimental Example 5 | 54.24 | 27.2 |
| Experimental Example 6 | 47.56 | 36.2 |

Note:
Anti-caking rate = (blank shear force − sample shear force)/blank shear force × 100%, blank shear force is 74.56 N.

Finally, it should be noted that above descriptions are only preferred embodiments of the present disclosure and not intended to limit the present disclosure. Although the present disclosure has been described in detail with reference to the foregoing embodiments, the technical solutions of which still can be modified or equivalently replaced for those skilled in the art. Any modification, equivalent replacement, improvement, etc. made within the spirit and principle of the present disclosure should be included in the claimed scope herein.

What is claimed is:

1. A method for preparing biomechanical unbleached pulp from wheat straw and full utilization of by-products thereof, wherein the method comprises the following steps:
    (1) cutting a physically-screened and dust-removed wheat straw into small pieces of 1-8 cm as raw materials, putting them into a processor or a reactor, and performing a hot water treatment according to a liquid ratio of 1:4-1:8 for 15-90 min to obtain a mixture of hot water and a hot water treated wheat straw in the reactor or processor; meanwhile collecting rotten wheat straw which cannot be used for processing;
    (2) adding KOH to the mixture of hot water and the hot water treated wheat straw in the reactor or processor, adjusting pH of the hot water to 10-14, and performing a hydrothermal saturation and softening treatment on the wheat straw to obtain a hydrothermally saturated and softened wheat straw; collecting waste lye;

(3) treating the hydrothermally saturated and softened wheat straw with an alkaline biological compound enzyme in a biological processor for 30-90 min in a liquid ratio of 1:3-1:8 (W/V) to obtain an enzyme treated wheat straw; collecting wastewater produced in an enzyme treatment stage;

(4) refining the enzyme treated wheat straw after treatment in step (3) with a pulp refiner to obtain a refined wheat straw; and (5) washing the refined wheat straw to obtain a biomechanical pulp; disintegrating and mixing the biomechanical pulp homogeneously with a fiber disintegrator to obtain an unbleached pulp, collecting refining washing water;

treating the waste lye, the wastewater produced in the enzyme treatment stage, and the refining washing water with a multi-effect evaporator to prepare residue by evaporation and concentration, and recycling heat energy for use in the hot water treatment stage of step (1); mixing the residue and the rotten wheat straw which cannot be used for processing in step (1) and adjusting pH thereof to prepare fertilizer.

2. The method according to claim 1, wherein the hot water treatment in step (1) is 80-120° C.

3. The method according to claim 1, wherein the hydrothermally saturation and softening treatment in step (2) comprises: keeping a temperature of the hot water at 80-120° C. for 20-60 min.

4. The method according to claim 1, wherein a pH of the wheat straw at the end of step (2) is 7-10.

5. The method according to claim 1, wherein a temperature in step (3) is 40-60° C.

6. The method according to claim 1, wherein the alkaline biological compound enzyme used in step (3) is a compound enzyme of an alkaline xylanase, an alkaline cellulase, and an alkaline pectinase with an enzyme dosage of 10-80 IU/mL, and an enzyme activity ratio of the alkaline xylanase, the alkaline cellulase, and the alkaline pectinase is 0-6:0-3:0-1.5, wherein each enzyme activity is not 0.

7. The method according to claim 6, wherein the enzyme activity ratio of the alkaline xylanase, the alkaline cellulase, and the alkaline pectinase is 1-4:1-2:1-1.5.

8. The method according to claim 1, wherein in step (5), a mass ratio of the waste lye, the wastewater produced in the enzyme treatment stage, and the refining washing water is 3-5:15-20:15-20;

a mass ratio of the residue to the rotten wheat straw which cannot be used for processing in step (1) is 5-8:1-2;

adjusting pH to prepare fertilizer is as follows: adding phosphoric acid to adjust the pH to 7, drying, pulverizing and granulating to obtain the fertilizer.

9. The method according to claim 1, wherein the alkaline biological compound enzyme used in step (3) is a compound enzyme of an alkaline xylanase, an alkaline cellulase, and an alkaline pectinase with an enzyme dosage of 10-80 IU/mL, and an enzyme activity ratio of the alkaline xylanase, the alkaline cellulase, and the alkaline pectinase is 1-4:1-2:1-1.5.

10. The method according to claim 1, wherein the hydrothermally saturation and softening treatment in step (2) comprises: keeping a temperature of the hot water at 80-120° C. for 20-60 min.

* * * * *